May 14, 1929.    J. M. CLARK, SR    1,712,869
DETACHABLE LUGGAGE CARRIER
Filed Sept. 15, 1928    2 Sheets-Sheet 1

Inventor
J. M. Clark, Sr.

By Clarence A. O'Brien
Attorney

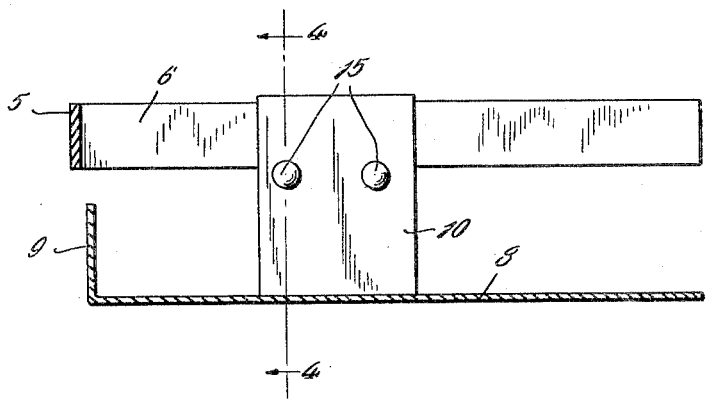
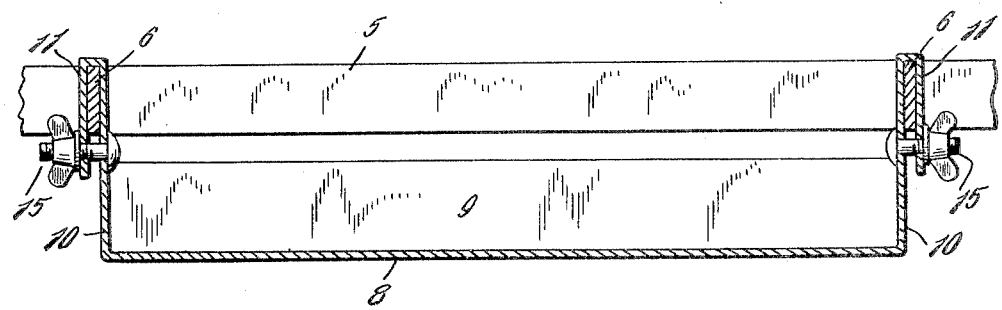
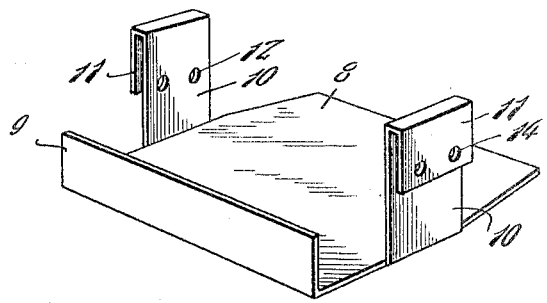

Patented May 14, 1929.

1,712,869

UNITED STATES PATENT OFFICE.

JAMES M. CLARK, SR., OF CHARLESTON, WEST VIRGINIA.

DETACHABLE LUGGAGE CARRIER.

Application filed September 15, 1928. Serial No. 306,283.

The present invention relates to a detachable luggage carrier and has for its prime object to provide a structure which may be mounted in the front bumper of an automobile particularly of the Ford Model A type.

Another very important object of the invention resides in the provision of a structure of this nature which is an improvement over the subject matter of my United States application for Letters Patent Serial No. 298,521 filed August 9, 1928.

A still further very important object of the invention resides in the provision of a luggage carrier of this nature which is exceedingly simple in its construction, may be manufactured at a very low cost and yet be made strong and durable and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:

Figure 2 is a longitudinal section therethrough taken substantially on the line 2—2 of Figure 1, Figure 4 is a transverse section taken substantially on the line 4—4 of Figure 2, and Figure 5 is a perspective view of the carrier.

Figure 1:
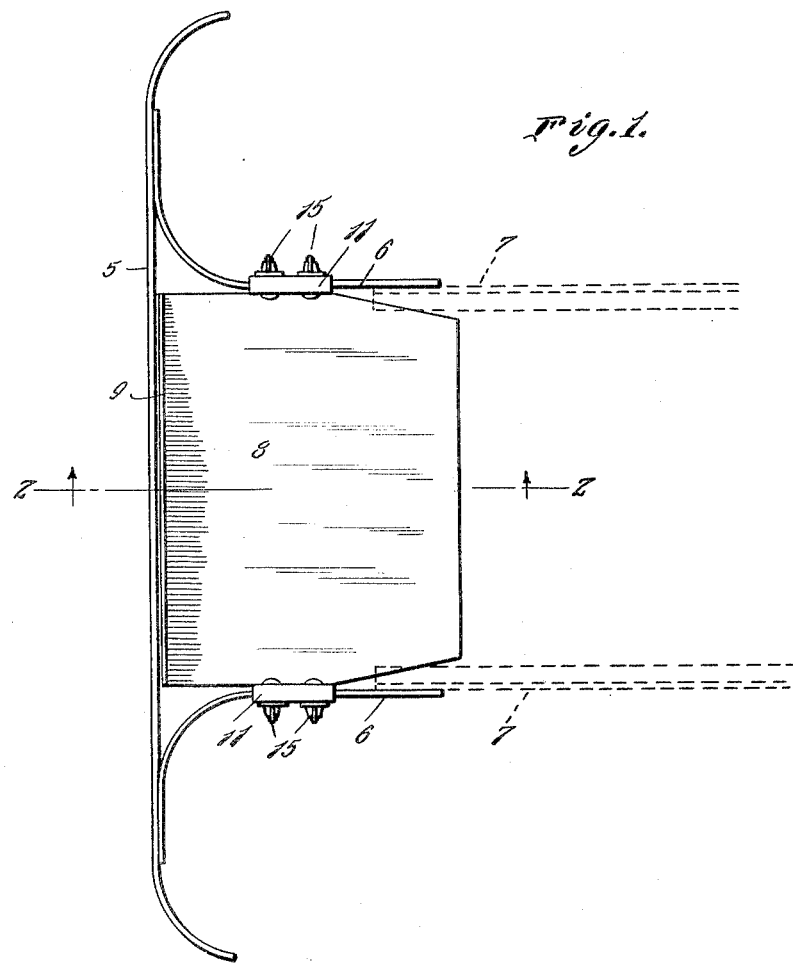
Figure 1 is a top plan view of my carrier, and the bumper.
Figure 3:
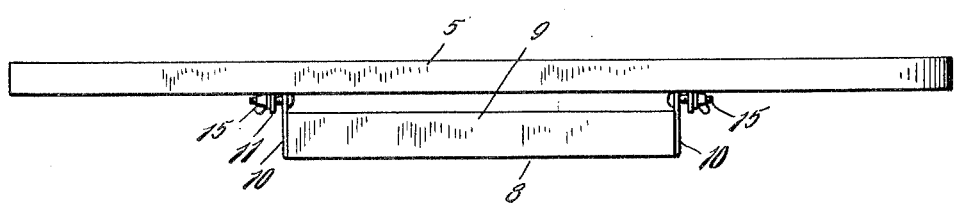
Figure 3 is a front elevation thereof.

Referring to the drawing in detail it will be seen that the numeral 5 denotes a bumper having the side bars 6 extending rearwardly therefrom to be secured to the chassis side bars 7.

This bumper is of the type which is used on Model A Ford automobile. This type of bumper, however, has been disclosed merely for the purposes of exemplification and no claim is made to the specific structure thereof.

My improved carrier includes a plate 8 having at its forward edge an upstanding flange 9. On the central portion of the side edges of the plate 8 there rise upwardly arms 10 the upper ends of which are directed outwardly and then downwardly to form overhanging portions 11 so as to engage over the side bars 6 as is clearly illustrated in Figure 4.

Openings 12 and 14 are provided in the arms 10 and the overhanging portions 11. Bolts 15 extend through the openings so that the overhanging portions and the arms may be securely clamped to the side bars 6.

This carrier is designed to fill the rectangular space between the radiator and bumper, and closed on the sides by the two bars 6. Because of the possibility of sometimes needing to crank the automobile, in case of starter trouble and the like, it is desirable that the carrier in this position may be quickly removed.

This carrier is so designed that it may be entirely removed from the frame of the car by taking out the four hand bolts. When these bolts are removed the carrier may be easily lifted out as will be apparent.

The entire carrier is made of one sheet of metal with the exception of the four hand bolts above mentioned thereby securing economy of construction and rigidity when in position on the frame of the bumper structure.

The present embodiment of the invention has been disclosed in detail for the purposes of exemplification since it is apparent that changes in the details of construction may be resorted to without departing from the spirit or scope of the invention as hereinafter claimed or sacrificing any of its advantages.

Having thus described my invention, what I claim as new is:

1. A carrier of the class described formed from a single sheet of metal including a plate having the front edge thereof formed with an upstanding flange co-extensive with the plate and the sides formed with upstanding arms the upper edges of which are curved outwardly and over upon themselves.

2. A carrier of the class described formed from a single sheet of metal including a plate having the front edge thereof formed with an upstanding flange and the sides formed with upstanding arms the upper edges of which are curved outwardly and over upon themselves, said curved portions of the arms provided with openings and bolts extending through openings in the overturned portions and the arms for detachably connecting the carrier to an automobile fender.

3. In combination, a bumper including a pair of spaced side bars, a luggage carrier formed from a single sheet of metal to include a plate having an upstanding flange at the front edge and a pair of upstanding arms on the side edges, the upper edges of which overhang themselves to overhang the side bars of the bumper.

In testimony whereof I affix my signature.

JAMES M. CLARK, Sr.